(12) United States Patent
Liao et al.

(10) Patent No.: US 9,684,422 B2
(45) Date of Patent: *Jun. 20, 2017

(54) SMART DEVICE HAVING ABILITY FOR REJECTING MISTAKEN TOUCHING

(71) Applicant: PIXART IMAGING INC., Hsin-Chu (TW)

(72) Inventors: Chi-Chieh Liao, Hsin-Chu (TW); Yi-Hsien Ko, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 53 days.

This patent is subject to a terminal disclaimer.

(21) Appl. No.: 14/840,125

(22) Filed: Aug. 31, 2015

(65) Prior Publication Data

US 2016/0195980 A1 Jul. 7, 2016

Related U.S. Application Data

(63) Continuation-in-part of application No. 14/591,150, filed on Jan. 7, 2015.

(30) Foreign Application Priority Data

Jan. 16, 2015 (TW) .............................. 104101495 A

(51) Int. Cl.
*G06F 3/044* (2006.01)
*G06F 3/0338* (2013.01)

(52) U.S. Cl.
CPC ............ *G06F 3/044* (2013.01); *G06F 3/0338* (2013.01); *G06F 2203/04103* (2013.01); *Y10T 29/49155* (2015.01)

(58) Field of Classification Search
CPC ........ G06F 3/044; G06F 3/0416; G06F 3/041; G06F 3/0412; G06F 3/0338
See application file for complete search history.

(56) References Cited

U.S. PATENT DOCUMENTS

2006/0007179 A1 1/2006 Pihlaja
2006/0146019 A1 7/2006 Ahlgren et al.
(Continued)

FOREIGN PATENT DOCUMENTS

CN 101930316 A 12/2010
CN 101950224 A 1/2011
(Continued)

*Primary Examiner* — Fred Tzeng
(74) *Attorney, Agent, or Firm* — Li & Cai Intellectual Property (USA) Office

(57) ABSTRACT

A smart device having ability for rejecting mistaken touching is illustrated, which comprises a capacitive button module which comprises a contacting layer, a first electrode layer, a second electrode layer and an elastic layer. A first electrode of the first electrode layer and a second electrode of the second electrode layer form a first inductive capacitor, and the second electrode and a third electrode of the second electrode layer form a second inductive capacitor. When the elastic layer receives a pressure and generates a deformation, a pressing signal is generated according to a capacitance variation of the first inductive capacitor. When a conductor is close to or in contact with the contacting layer, a moving signal is generated according to a capacitance variation of the second inductive capacitor.

16 Claims, 10 Drawing Sheets

(56) References Cited

U.S. PATENT DOCUMENTS

| | | | |
|---|---|---|---|
| 2013/0126325 A1 | 5/2013 | Curtis et al. | |
| 2013/0231046 A1* | 9/2013 | Pope | G06K 9/00013 455/41.1 |
| 2013/0234977 A1 | 9/2013 | Lin et al. | |
| 2014/0055411 A1* | 2/2014 | Zhao | G06F 3/044 345/174 |
| 2014/0104510 A1* | 4/2014 | Wang | G06F 3/0412 349/12 |
| 2014/0111471 A1* | 4/2014 | Zhao | G02F 1/13338 345/174 |
| 2014/0146002 A1* | 5/2014 | Mo | G06F 3/0416 345/174 |
| 2014/0176484 A1* | 6/2014 | Tsai | G06F 3/0412 345/174 |
| 2014/0199944 A1* | 7/2014 | Ran | H04B 5/0087 455/41.1 |
| 2014/0211104 A1* | 7/2014 | Yang | G06F 3/041 349/12 |
| 2016/0026311 A1* | 1/2016 | Wang | G06F 3/044 345/173 |
| 2016/0154515 A1* | 6/2016 | Mu | G06F 3/0412 345/174 |
| 2016/0363808 A1* | 12/2016 | Zou | G06F 3/0416 |

FOREIGN PATENT DOCUMENTS

| | | |
|---|---|---|
| TW | 201113779 A1 | 4/2011 |
| TW | 201205404 A | 2/2012 |

\* cited by examiner

SMART DEVICE HAVING ABILITY FOR REJECTING MISTAKEN TOUCHING

CROSS REFERENCE TO RELATED APPLICATION

This is a continuation-in-part application of patent application Ser. No. 14/591,150 filed on Jan. 7, 2015. The entirety of each of the above-mentioned patent applications is hereby incorporated by reference herein and made a part of this specification.

BACKGROUND

1. Technical Field

The present disclosure relates to a smart device, in particular, to a smart device having ability for rejecting mistaken touching.

2. Description of Related Art

Recently, a smart device, such as a smart phone or a tablet, is used everywhere. The smart device often has at least one button, and the button is usually set on one side of the smart device. A user can operate the smart device through the button. For example, unlocking a screen of the smart device or adjusting a volume of the smart device.

The button set on a conventional smart device can be divided into two types: a mechanical button and a capacitive button.

A feature of the mechanical button is that the mechanical button generates a signal when a switch of the mechanical button is triggered. In a general state, the switch is withstood by a latch and electrically isolated from a specific conductor, such that the mechanical button does not generate any signals. When a user exerts force on the mechanical button, the switch is turned on and electrically connected to the specific conductor, and then the mechanical button generates the signal. However, repeatedly pressing the mechanical button may cause a malfunction.

On the other hand, the capacitive button changes capacitance utilizing a capacitance effect. A detecting chip detects a capacitance variation to determine whether the capacitive button is pressed. The capacitive button is not broken easily because of repeatedly pressing the capacitive button. However, the capacitive button makes mistaken touching easier than the mechanical button. For example, when the user puts the smart device into a backpack or a pocket, the capacitive button may be triggered by an external conductor, and then the screen of the smart device is unlocked, or the volume of the smart device is adjusted.

The mistaken touching described above is not a user's intention. Hence, a smart device having the ability of rejecting mistaken touching is need, and the smart device can reduce wear caused by repeatedly pressing a button of the smart device.

SUMMARY

An exemplary embodiment of the present disclosure provides a smart device having ability for rejecting mistaken touching. The smart device comprises a capacitive button module which is disposed on the smart device. The capacitive button module comprises a contacting layer, a first electrode layer, a second electrode layer and an elastic layer. The first electrode layer comprises a first electrode. The second electrode layer is disposed under the contacting layer, and comprises at least one second electrode and at least one third electrode. The elastic layer is disposed between the first electrode layer and the second electrode layer, and is configured for operatively generating a deformation when the elastic layer receives a pressure, such that a distance between the first electrode layer and the second electrode layer is changed. The first electrode and the second electrode form a first inductive capacitor. The second electrode and the third electrode form a second inductive capacitor. When the elastic layer receives the pressure and generates the deformation, a pressing signal is generated according to a capacitance variation of the first inductive capacitor. When a conductor is close to or in contact with the contacting layer, a moving signal is generated according to a capacitance variation of the second inductive capacitor.

An exemplary embodiment of the present disclosure provides a smart device having ability for rejecting mistaken touching. The smart device comprises a capacitive button module which is disposed on the smart device. The capacitive button module comprises a contacting layer, a first electrode layer, a second electrode layer and an elastic layer. The first electrode layer comprises a first electrode. The second electrode layer is disposed under the contacting layer, and comprises at least one second electrode. The elastic layer is disposed between the first electrode layer and the second electrode layer, and is configured for operatively generating a deformation when the elastic layer receives a pressure, such that a distance between the first electrode layer and the second electrode layer is changed. The first electrode and the second electrode form a first inductive capacitor. When the elastic layer receives the pressure and generates the deformation, a pressing signal is generated according to a capacitance variation of the first inductive capacitor.

To sum up, the smart device provided by the present disclosure has the ability of rejecting mistaken touching. A control unit controls the smart device to perform a specific action when the control unit receives a pressing signal at least. In other words, when the control unit only receives a moving signal, the control unit does not perform the specific action. When the capacitive button module is touched slightly, the smart device determines this touching is a mistaken touching Hence, the smart device can effectively avoid mistaken touching.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

The aforementioned illustrations and detailed descriptions are exemplarity for the purpose of further explaining the scope of the instant disclosure. Other objectives and advantages related to the instant disclosure will be illustrated in the subsequent descriptions and appended drawings.

Hereinafter, the concept of the present invention may be embodied in many different forms and should not be construed as limited to the exemplary embodiment set forth herein. Rather, the exemplary embodiments are provided so that the instant disclosure will be thorough, complete, and will fully convey the scope of the inventive concept by those skilled in the art. For the purpose of viewing, the relative sizes of layers and regions are exaggerated in all drawings, and similar numerals indicate like elements.

Notably, the terms first, second, third, etc., may be used herein to describe various elements or signals, but these signals should not be affected by such elements or terms. Such terminology is used to distinguish one element from another or a signal with another signal. Further, the term "or" as used herein in the case may include any one or combinations of the associated listed items.

Figure 1A:
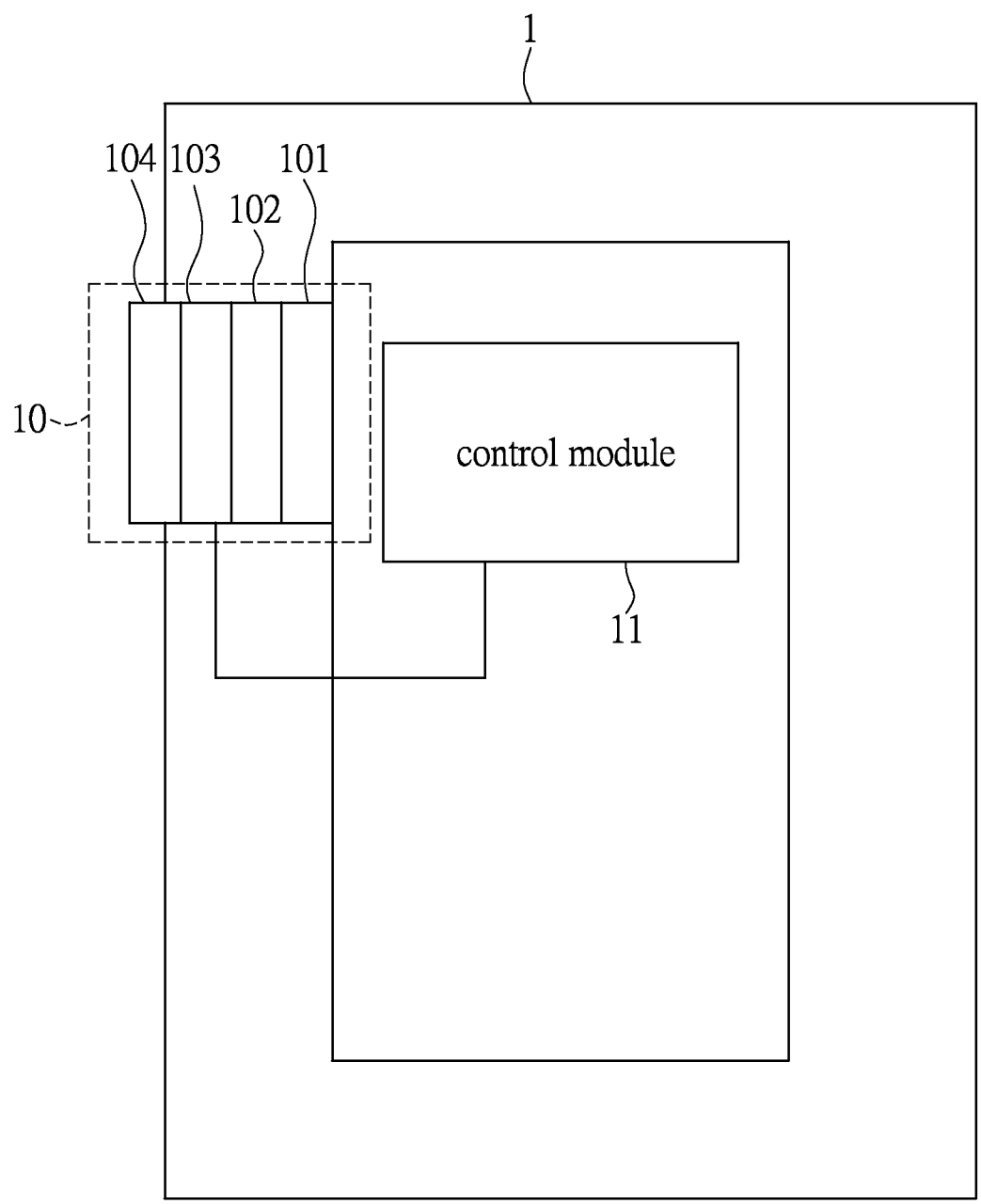
FIG. 1A is a schematic diagram of a smart device provided in accordance with an exemplary embodiment of the present disclosure.

Please refer to FIG. 1A, which shows a schematic diagram of a smart device when the smart device is pressed provided in accordance with an exemplary embodiment of the present disclosure. The smart device 1 comprises a capacitive button module 10 and a control module 11. The capacitive button module 10 is disposed on a surface of the smart device 1, and the capacitive button module 10 is configured for operatively providing a user to operate the smart device 1. The capacitive button module 10 is disposed on one side of the smart device 1 commonly. The capacitive button module 10 can be an unlock switch or a volume control switch of the smart device 1, and the present disclosure is not limited thereto. The user can operate the capacitive button module 10 to generate a pressing signal and a moving signal. The capacitive button module 10 includes a first electrode layer 101, an elastic layer 102, a second electrode layer 103 and a contacting layer 104. Detailed structure of the capacitive button module 10 will be introduced in the paragraphs below.

Figure 1B:
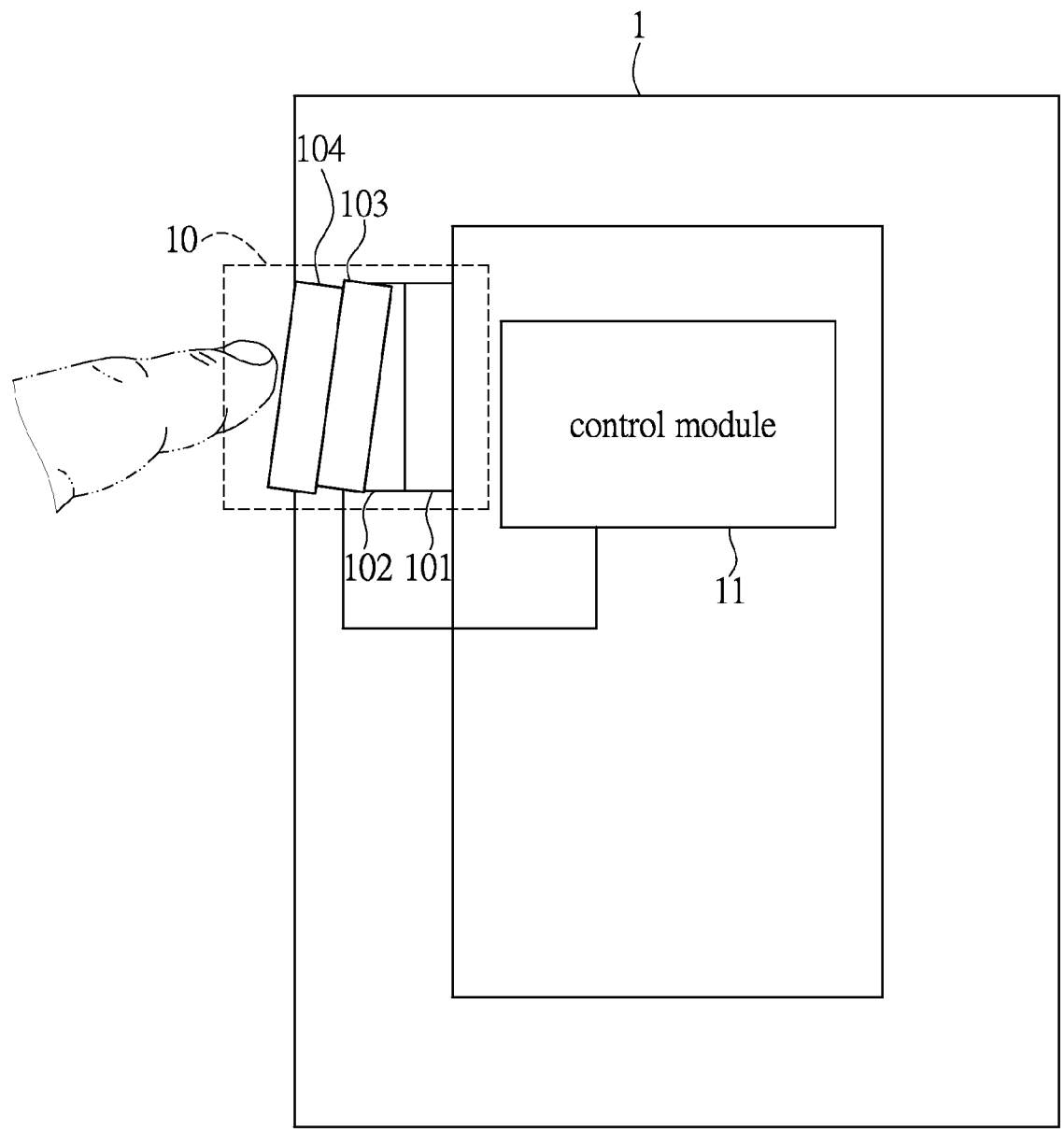
FIG. 1B is a schematic diagram of a smart device when the smart device is pressed provided in accordance with an exemplary embodiment of the present disclosure.

Please refer to FIG. 1B, which shows a schematic diagram of a smart device when the smart device is pressed provided in accordance with an exemplary embodiment of the present disclosure. The user can operate the capacitive button module 10 by a conductor, such as a finger.

Figure 2:
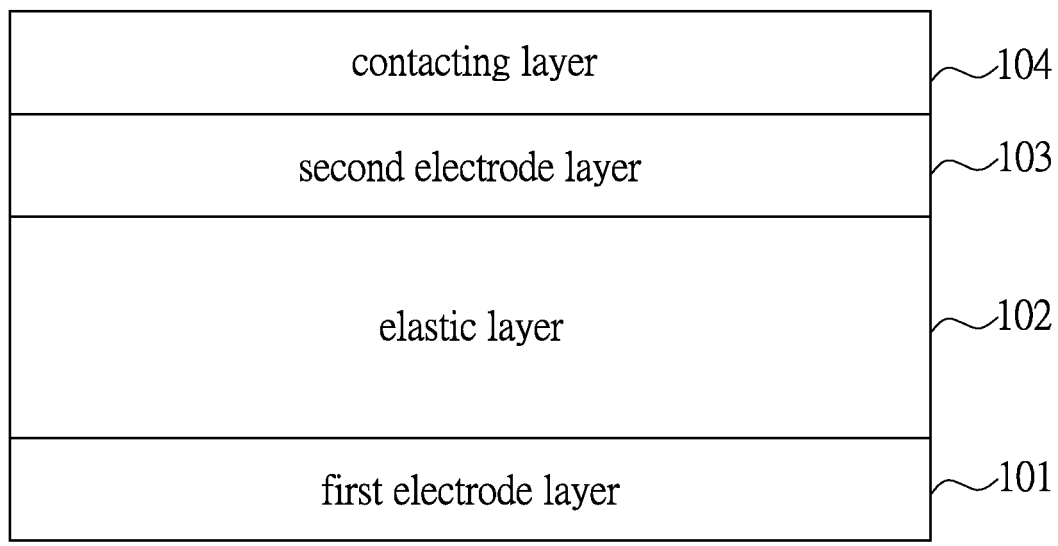
FIG. 2 is a structure diagram of a capacitive button module provided in accordance with an exemplary embodiment of the present disclosure.

Please refer to FIG. 2, which shows a structure diagram of a capacitive button module provided in accordance with an exemplary embodiment of the present disclosure. The capacitive button module 10 includes a first electrode layer 101, an elastic layer 102, a second electrode layer 103 and a contacting layer 104. In the exemplary embodiment, the contacting layer 104 is composed of non-conductive materials. The user can perform a moving operation and a pressing operation through the contacting layer 104.

The first electrode layer 101 includes at least one first electrode (not shown in FIG. 2). The second electrode layer 103 is disposed under the contacting layer 104, and the second electrode layer 103 comprises at least one second electrode (not shown in FIG. 2) and at least one third electrode (not shown in FIG. 2). The first electrode and the second electrode form a first inductive capacitor, and the first electrode or the second electrode is configured for generating a pressing signal according to a capacitance variation of the first inductive capacitor. The second electrode and the third electrode form a second inductive capacitor, and the second electrode or the third electrode is configured for operatively generating a moving signal according to a capacitance variation of the second inductive capacitor.

The elastic layer 102 is disposed between the first electrode layer 101 and the second electrode layer 103. The elastic layer 102 is composed of elastic materials, and the elastic materials are non-conductive. For example, the elastic material is a rubber or a sponge. When the user presses the capacitive button module 10, the elastic layer 102 receives the pressure and generates the deformation, and a distance between the first electrode layer 101 and second the electrode layer 103 is changed. Because of the distance between the first electrode layer 101 and second the electrode layer 103 is changed, the first inductive capacitor formed between the first electrode and the second electrode is affected.

To put it concretely, when the finger of the user presses the capacitive button module 10 to perform the pressing operation, the distance between the first electrode and the second electrode, which correspond to an area pressed by the user, is changed, such that the first inductive capacitor formed between the corresponding first electrode and the second electrode is changed. The area pressed by the user can be calculated according to a capacitance variation of the first inductive capacitor, and a pressing signal is generated. When the finger of the user is close to or in contact with the contacting layer 104 to perform the moving operation, the second inductive capacitor formed between the corresponding second electrodes and the third electrodes are affected, such that capacitance of the second inductive capacitor formed between the corresponding second electrodes and the third electrodes are changed. Areas where the finger passes can be calculated according to a capacitance variation of the second inductive capacitor, and a moving signal is generated.

Incidentally, a force which the user exerts on the capacitive button module 10 can be determined based upon a number of the first electrode or the second electrode affected by the user. The more the number of the first electrode or the second electrode affected by the user, the more force which the user exerts on the capacitive button module 10. When the number of the first electrode or the second electrode affected by the user is less than a threshold, meaning that the force which the user exerts on the capacitive button module 10 is not enough, the first electrode or the second electrode does not generate the pressing signal. In other words, the force which the user exerts on the capacitive button module 10 is associated with pressing situation of the first electrode or the second electrode.

When the finger of the user presses the capacitive button module 10, the capacitive button module 10 generates the pressing signal according to the capacitance variation of the first inductive capacitor. When the finger of the user is in contact with the capacitive button module 10 and begins to move (such as moving from a top block of the capacitive button module 10 to a bottom block of the capacitive button module 10), the capacitive button module 10 generates the moving signal according to the capacitance variation of the second inductive capacitor. A control unit (not shown in FIG. 1B) of the control module 11 receives the pressing signal, and then performs a corresponding action, or, the control unit of the control module 11 receives the pressing signal and the moving signal, and then performs the corresponding action.

For example, when the capacitive button module 10 of a smart device 1 is an unlock switch, the user can operate the capacitive button module 10 such that the capacitive button module 10 generates the pressing signal. The control module 11 receives the pressing signal, and then the control unit of the control module 11 unlocks a screen of the smart device 1. In another exemplary embodiment, the user can operate the capacitive button module 10, such that the capacitive button module 10 generates the pressing signal and the moving signal. The control module 11 receives the pressing signal and the moving signal, and then the control unit of the control module 11 unlocks the screen of the smart device 1.

As another example, when the capacitive button module 10 of the smart device 1 is a volume adjusting switch, the user can press and slide on the capacitive button module 10, such that the capacitive button module 10 generates the pressing signal and the moving signal. The control module 11 receives the pressing signal and the moving signal, and then the control unit of the control module 11 adjusts a volume of the smart device 1. Notably, applications of the capacitive button module 10 should not be limited by examples of the above exemplary embodiments. In the following exemplary embodiment, the capacitive button module 10 comprises both functions of the unlock switch and the volume adjusting switch simultaneously.

Figure 3A:
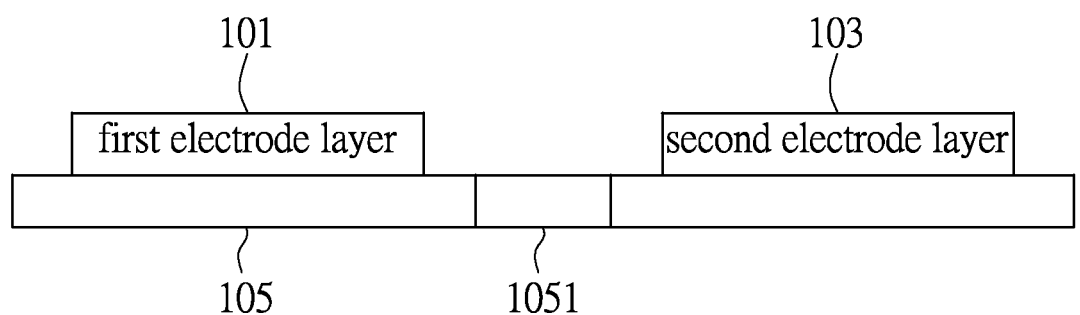
FIG. 3A to FIG. 3B are schematic diagrams of manufacturing a capacitive button module provided in accordance with an exemplary embodiment of the present disclosure.
Figure 3B:
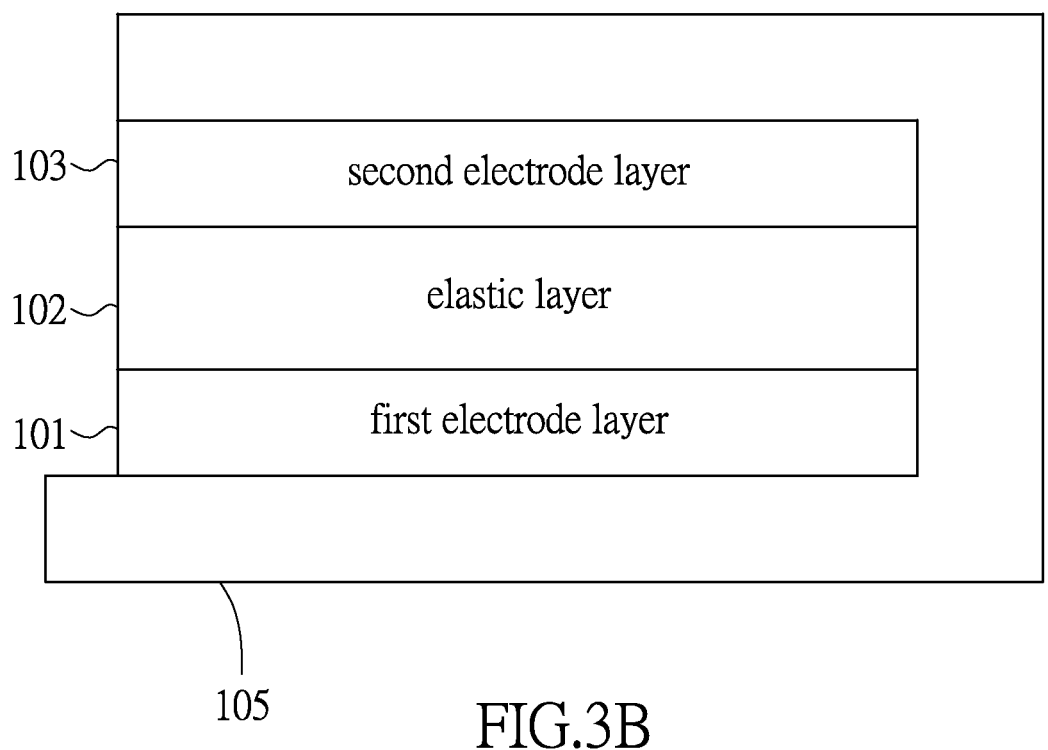

Please refer to FIG. 3A to FIG. 3B, which show schematic diagrams of manufacturing a capacitive button module provided in accordance with an exemplary embodiment of the present disclosure. A first electrode layer 101 and a second electrode layer 103 are formed on a flexible board 105 directly, and the first electrode layer 101 and the second electrode layer 103 are respectively formed on two sides of a bending region 1051 of the flexible board 105. After disposing an elastic layer 102 on the first electrode layer 101, the bending region 105 is bended and forms a structure shown in FIG. 3B. Notably, the elastic layer 102 is disposed on the first electrode layer 101 in the exemplary embodiment, but the present disclosure is not limited thereto. In another exemplary embodiment, the elastic layer 102 is disposed on the second electrode layer 103, or a part of the elastic layer 102 is disposed on the first electrode layer 101 and another part of the elastic layer 102 is disposed on the second electrode layer 103.

A part of the flexible board 105 overlapping the second electrode layer 103 can operate as a contacting layer 104 for allowing the user to perform a pressing operation and a moving operation. In other words, the contacting layer 104 can be a part of the flexible board 105 directly. However, the present disclosure is not limited thereto. In another exemplary embodiment, the contacting layer 104 is an insulation layer disposed on a part of the flexible board 105 overlapping the second electrode layer 103 as shown in FIG. 2.

Figure 4:
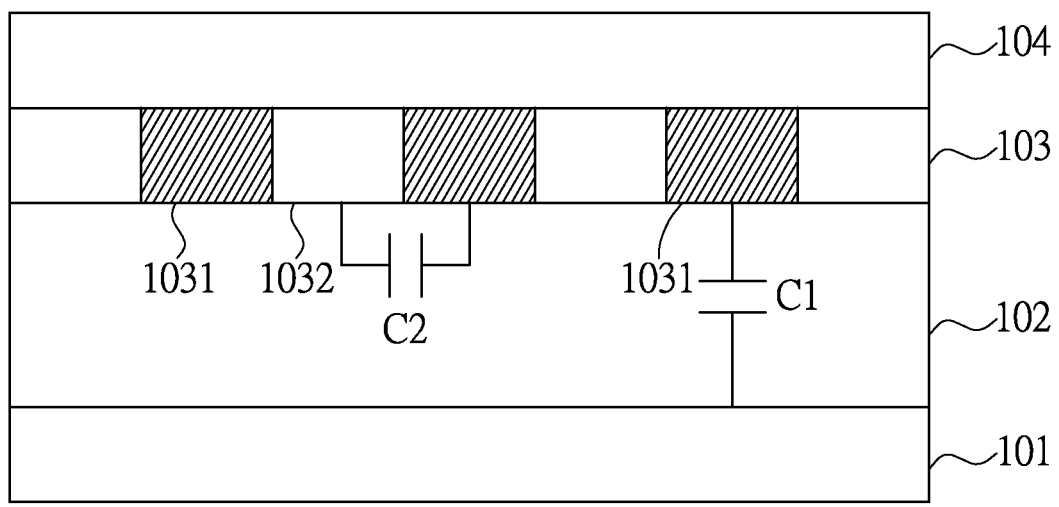
FIG. 4 is a structure diagram of a capacitive button module provided in accordance with another exemplary embodiment of the present disclosure.

Please refer to FIG. 4, which shows a structure of a capacitive button module provided in accordance with another exemplary embodiment of the present disclosure. A second electrode layer 103 comprises at least one second electrode 1031 and at least one third electrode 1032. A first electrode layer 101 comprises a first electrode (not shown in FIG. 4). The second electrode 1031 is electrically isolated from the third electrode 1032. The second electrode 1031 and the third electrode 1032 form a second inductive capacitor C2. The first electrode and the second electrode 1031 form a first inductive capacitor C1.

The first electrode of the first electrode layer 101 can be a driving electrode. The second electrode 1031 of the second electrode layer 103 can be a sensing electrode, and the third electrode 1032 can be the driving electrode. The driving electrode is configured for operatively generating a driving signal. The sensing electrode is configured for operatively generating a pressing signal or a moving signal in response to capacitance variation of the first inductive capacitor C1 or the second inductive capacitor C2. A capacitive button module 10 can set only one driving electrode, or the capacitive button module 10 sets a plurality of driving electrodes according to different applications. In the exemplary embodiment, a number of the sense electrode is larger than 1, such that the driving electrodes can detect a plurality of the first inductive capacitors C1 or the second inductive capacitors C2.

When a finger of the user presses the contacting layer 104 to perform a pressing operation, a distance between the second electrode 1031 and the first electrode is changed, such that electric field between the second electrode 1031 and the first electrode is affected. Then, capacitance of the first inductive capacitors C1 detected by the second electrode 1031 is varied. A force and a pressing position of the finger can be determined based upon the capacitance variation of the corresponding first inductive capacitors C1. When the finger of the user comes close to or in contact with the contacting layer 104 to perform a moving operation, the electric field between the second electrode 1031 and the third electrode 1032 is affected. Then, capacitance of the second inductive capacitors C2 detected by the second electrode 1031 is varied. A displacement direction and a displacement velocity of the finger can be determined based upon the capacitance variation of the corresponding second inductive capacitors C2.

To put it concretely, the contacting layer 104 is configured for operatively allowing the user to perform the pressing operation and the moving operation. The elastic layer 102 is disposed between the first electrode layer 101 and the second electrode layer 103. The elastic layer 102 is configured for operatively generating a deformation when the elastic layer 102 receives a pressure within the pressing operation, and changes the distance between the first electrode layer 101 and the second electrode layer 103. The first electrode of the first electrode layer 101 and the third electrode 1032 of the second electrode layer 103 are the driving electrodes. The second electrode 1031 of the second electrode layer 103 is the sensing electrode. When the user performs the pressing operation, the second electrode 1031 generates the pressing signal according to the capacitance variation of the first inductive capacitor C1. When the user performs the moving operation, the second electrode 1031 generates the moving signal according to the capacitance variation of the second inductive capacitor C2.

When the finger (or other kind of conductor) presses the capacitive button module 10, the distance between the first electrode layer 101 and the second electrode layer 103 decreases such that the capacitance of the first inductive capacitor C1 increases. If the capacitance variation of the first inductive capacitors C1 is higher than a first variation threshold, the corresponding second electrode 1031 generates the pressing signal. Notably, the present disclosure does not limit a value of the first variation threshold, and those skilled in the art can design the first variation threshold according to requirements.

On the other hand, if the finger is close to or in contact with the contacting layer 104, the capacitance of the second inductive capacitor C2 decreases. If the capacitance variation of the second inductive capacitors C2 is higher than a second variation threshold, the corresponding second electrode 1031 generates the moving signal. Notably, the present disclosure does not limit a value of the second variation threshold, and those skilled in the art can design the second variation threshold according to requirements.

It is worth to note that, in the exemplary embodiment, the second electrode 1031 is the sensing electrode, and the first electrode and the third electrode 1032 are the driving electrodes. However, the present disclosure is not limited thereto. In another exemplary embodiment, the second electrode 1031 is the driving electrode, and the first electrode and the third electrode 1032 are the sensing electrodes. Moreover, the present disclosure does not limit a number of the driving electrode and the sensing electrode. In the exemplary embodiment, the number of the driving electrode is greater than or equal to 1. The number of the sensing electrode is greater than 1, such that the sensing electrode can generate the pressing signal and the moving signal according to the capacitance variation of the corresponding inductive capacitor.

Figure 5:
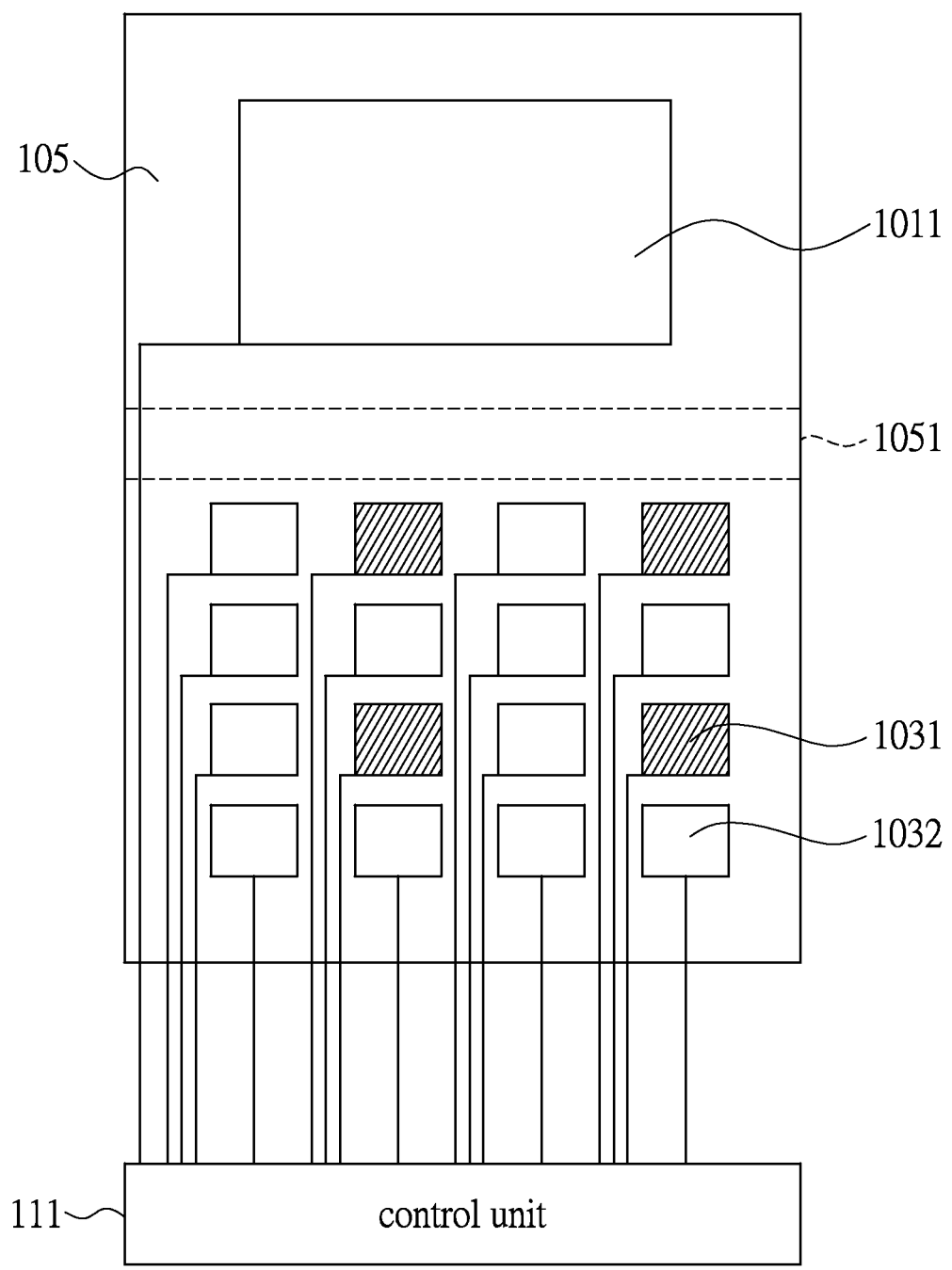
FIG. 5 is a schematic diagram of electrodes disposed in a capacitive button module provided in accordance with an exemplary embodiment of the present disclosure.

Please refer to FIG. 4 and FIG. 5. FIG. 5 is a schematic diagram of electrodes disposed in a capacitive button module provided in accordance with an exemplary embodiment of the present disclosure. In FIG. 5, on one side of a flexible board 105 is disposed a first electrode layer 101, and on another side of the flexible board 105 is disposed a second electrode layer 103. The first electrode layer 101 includes a first electrode 1011. The second electrode layer 103 includes a plurality of second electrodes 1031 and a plurality of third electrodes 1032. The second electrodes 1031 and the third electrodes 1032 form a 4*4 matrix. The second electrodes 1031 are electrically isolated from the third electrodes 1032. In the exemplary embodiment, the second electrodes 1031 are sensing electrodes. The first electrode 1011 and the third electrodes 1032 are the driving electrodes. The flexible board 105 is bended through a bending region 1051 and forms a structure shown in FIG. 3B. Incidentally, the number of the second electrodes 1031 and the third electrodes 1032, and an arrangement of the second electrodes 1031 and the third electrodes 1032 should not be limited to the examples provided by the exemplary embodiment.

In the exemplary embodiment, each second electrode 1031 has the same area, and each third electrode 1032 has the same area. However, the areas of the second electrodes 1031 and the third electrodes 1032 are not limited to the examples provided by the instant embodiment. In another exemplary embodiment, the areas of a part of the second electrodes 1031 are different from the areas of another part of the second electrodes 1031, and the area of a part of the third electrodes 1032 are different from the areas of another part of the third electrodes 1032. Briefly, a person with ordinary skill in the art can design the electrode numbers, the areas and the arrangements of the second electrodes 1031 and the third electrodes 1032 according to practical demands.

The first electrode 1011, the second electrodes 1031 and the third electrodes 1032 are respectively coupled to a control unit 111 of a control module through traces. The control unit 111 is configured for operatively receiving the pressing signal generated by the first electrode 1011 or the second electrodes 1031 within the pressing operation, and receiving the moving signal generated by the second electrodes 1031 or the third electrodes 1032 within the moving operation. When the control unit 111 receives the pressing signal, or the control unit 111 receives the pressing signal and the moving signal, the control unit 111 controls the smart device 1 to perform a specific action. For example, the specific action is unlocking the smart device 1, or adjusting a volume of the smart device 1. When the control unit 111 only receives the moving signal, the control unit 111 does not control the smart device 1 to perform the specific action. Accordingly, the smart device 1 can effectively avoid mistaken touching.

Figure 6:
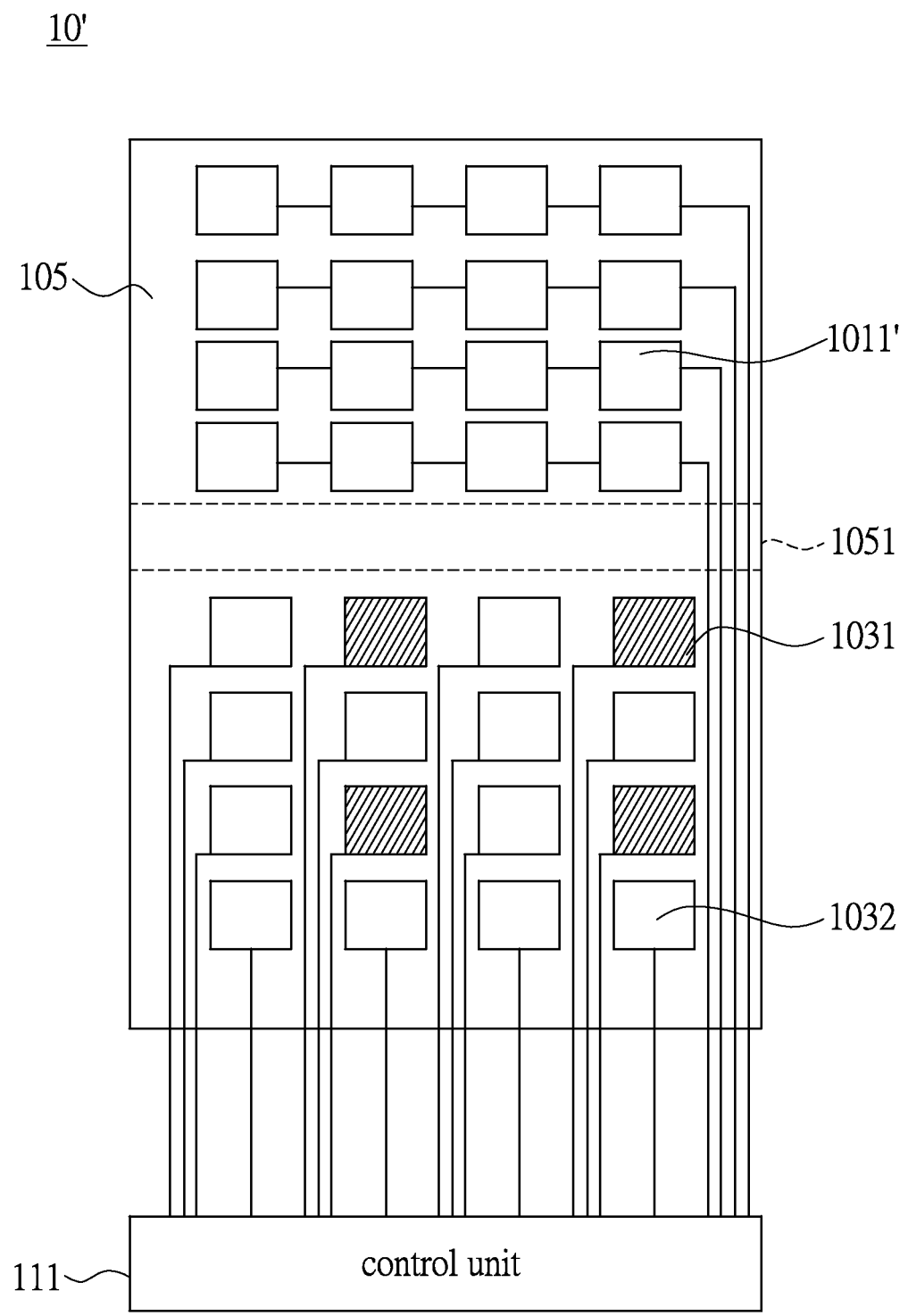
FIG. 6 is a schematic diagram of electrodes disposed in a capacitive button module provided in accordance with another exemplary embodiment of the present disclosure.

Please refer to FIG. 6, which shows a schematic diagram of electrodes disposed in a capacitive button module provided in accordance with another exemplary embodiment of the present disclosure. A structure of the capacitive button module 10' shown in FIG. 6 is similar to the capacitive button module 10 shown in FIG. 5, and therefore only differences between them will be described below. Unlike the capacitive button module 10 shown in FIG. 5, a first electrode layer of the capacitive button module 10' includes a plurality of first electrodes 1011', and the first electrodes 1011' form a 4*4 matrix. The first electrodes 1011', the second electrodes 1031 and the third electrodes 1032 are respectively coupled to a control unit 111 of a control module through traces, such that the control unit 111 can receive a pressing signal and the moving signal. Incidentally, electrode numbers and arrangements of the first electrodes 1011' are just taken as an example, but the present disclosure is not limited thereto. Furthermore, the present disclosure does not limit that the first electrodes 1011' has the same area. Briefly, a person with ordinary skill in the art can design the first electrode layer according to practical demands.

The above descriptions introduce a structure and a function of the capacitive button module 10, and the following descriptions will introduce an ability of the smart device 1 for rejecting mistaken touching According to the above description, the control unit 111 controls the smart device 1 to perform the specific action after receiving the pressing signal or receiving the pressing signal and the moving signal.

Please refer to FIGS. 1A, 1B, 4 and 5. When the finger of the user presses the contacting layer 104, the distance between the first electrode layer 101 and the second electrode layer 103 decreases, and the capacitance of the first inductive capacitor C1 increases. When the capacitance variation of the first inductive capacitors C1 is higher than the first variation threshold, the corresponding first electrode 1011 or the second electrode 1031 generates the pressing signal. In the exemplary embodiment, the second electrodes 1031 are sensing electrodes, and the pressing signal is generated by the corresponding second electrode 1031.

When the control unit 111 receives the pressing signal, the control unit 111 controls the smart device 1 to perform the specific action. For example, the specific action is unlocking the smart device 1, meaning that the user can unlock a screen of the smart device 1 by pressing the capacitive button module 10.

In another exemplary embodiment, the control unit 111 controls the smart device 1 to unlock the screen of the smart device 1 after receiving the pressing signal and the moving signal. For example, the finger of the user presses the capacitive button module 10 to generate the pressing signal at first, and then the finger slides on the contacting layer 104 of the capacitive button module 10 to generate the moving signal. When the control unit 111 receives the pressing signal and the moving signal, the control unit 111 controls the smart device 1 to unlock the smart device 1.

Moreover, in the exemplary embodiment, the control unit 111 can control the smart device 1 to perform another action based upon the pressing signal and the moving signal. When a processing unit (not shown in FIG.) of the control module 11 detects the pressing signal, the processing unit instructs the control unit 111 to control the smart device 1 performing the specific action based upon the moving signal within a fixed time period.

To put it concretely, when the finger of the user is close to or in contact with the contacting layer 104, the second electrode 1031 detects that the capacitance of the second inductive capacitor C2 decreases. When the capacitance variation of the second inductive capacitors C2 is higher than a second variation threshold, the corresponding second electrode 1031 or third electrode 1032 generates the moving signal. In the exemplary embodiment, the second electrodes 1031 are sensing electrodes, and the moving signal is generated by the corresponding second electrode 1031. The processing unit of the control module 11 calculates a displacement velocity of the finger based upon a number of the electrodes which generates the moving signal. The more the number of the electrodes generating the moving signal, the higher the displacement velocity is. On the contrary, the fewer the number of the electrodes generating the moving signal, the lower the displacement velocity is. Notably, the present disclosure does not limit length of the fixed time period, and the person with ordinary skill in the art can design the length of the fixed time period according to practical demands.

Next, the processing unit calculates a displacement speed and a displacement direction in response to the displacement velocity of the finger. When the processing unit determines the displacement speed is higher than a speed threshold, the processing unit outputs a determining signal to the control unit 111. The determining signal instructs the displacement direction of the finger. Then, the control unit 111 controls the smart device 1 to perform the specific action based upon the pressing signal, the moving signal and the determining signal. Notably, the present disclosure does not limit a value of the speed threshold, and the person with ordinary skill in the art can design the value of the speed threshold according to practical demands.

For example, when the user wants to adjust the volume of the smart device 1, the user presses the capacitive button module 10 to generate the pressing signal at first. The processing unit of the control module 11 detects the pressing signal, and processing unit starts to count the fixed time period. Within the fixed time period, the finger of the user slides on the contacting layer 104 of the capacitive button module 10 to adjust the volume of the smart device 1.

In the exemplary embodiment, the capacitive button module 10 is disposed on the left side of the smart device 1. The present disclosure defines that the finger moving from a top block of the contacting layer 104 to a bottom block of the contacting layer 104 represents decreasing the volume, and the finger moving from the bottom block of the contacting layer 104 to the top block of the contacting layer 104 represents increasing the volume. However, the present disclosure is not limited thereto. A person with ordinary skill in the art can design the displacement direction and the corresponding specific action.

After the finger slides on the contacting layer 104 of the capacitive button module 10, the corresponding second electrode 1031 generates the moving signal according to the capacitance variation of the second inductive capacitor C2. The processing unit calculates the displacement speed and the displacement direction in response to the displacement velocity. When the processing unit determines the displacement speed is higher than the speed threshold, the processing outputs the determining signal to the control unit 111. Then, the control unit 111 adjusts the volume of the smart device 1 based upon the pressing signal, the moving signal and the determining signal.

It is noted that the processing unit is disposed in the control module 11. However, the present disclosure is not limited thereto. In another exemplary embodiment, the processing unit is disposed in the capacitive button module 10, 10'.

Figure 7A:
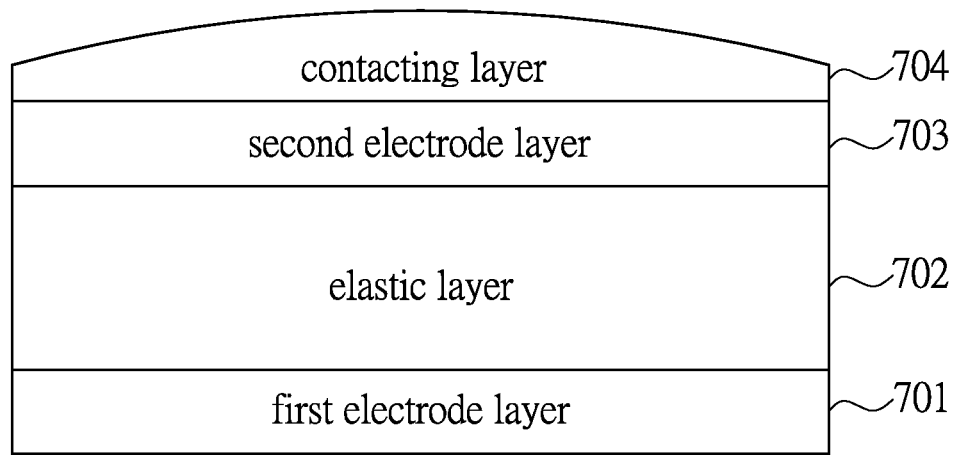
FIG. 7A to FIG. 7B are structure diagrams of a capacitive button module provided in accordance with another exemplary embodiment of the present disclosure.
Figure 7B:
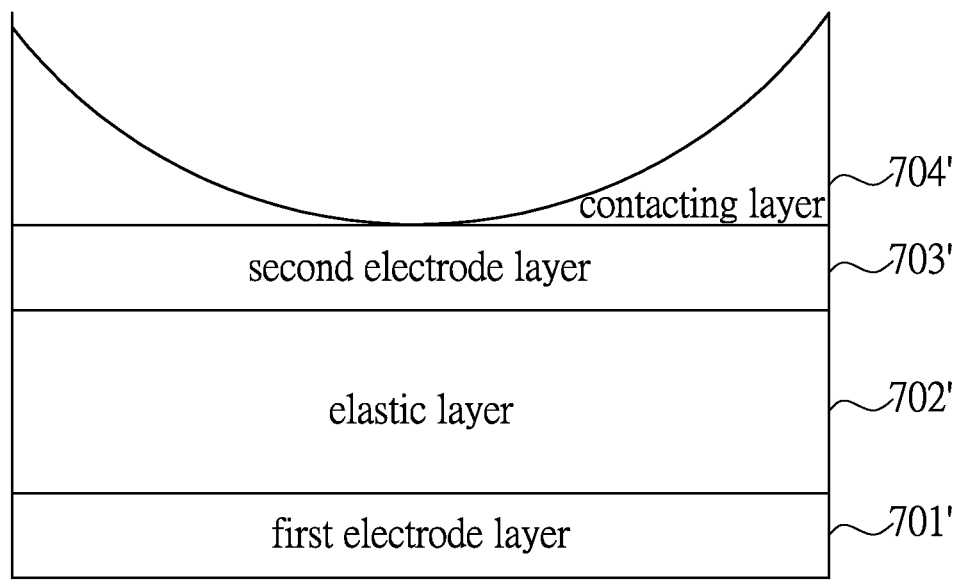

Please refer to FIG. 7A to FIG. 7B, which show structure diagrams of a capacitive button module provided in accordance with another exemplary embodiment of the present disclosure. Structures and functions of the capacitive button module 70 shown in FIG. 7A and the capacitive button module 70' shown in FIG. 7B are similar to the capacitive button module 10 shown in FIG. 2, and therefore only differences between them will be described below. The difference between the capacitive button module 70, the capacitive button module 70' and the capacitive button module 10 is that, a contacting layer 104 of the capacitive button module 10 is a plane surface, but a contacting layer 704 of the capacitive button module 70 is a convex surface. Furthermore, a contacting layer 704' of the capacitive button module 70' is a concave surface.

Figure 8:
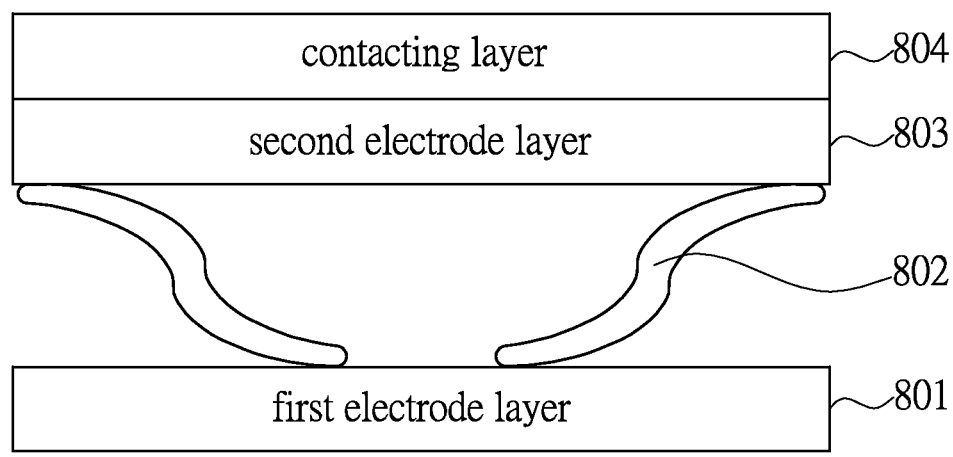
FIG. 8 is a structure diagram of a capacitive button module provided in accordance with another exemplary embodiment of the present disclosure.

Please refer to FIG. 8, which shows a structure diagram of a capacitive button module provided in accordance with another exemplary embodiment of the present disclosure. The structure and a function of the capacitive button module 80 shown in FIG. 8 are similar to the capacitive button module 10 shown in FIG. 2, and therefore only differences between them will be described below. Unlike to the capacitive button module 10, the capacitive button module 80 does not include an elastic layer. Instead, the capacitive button module 80 includes at least one elastic unit 802. Two terminals of the elastic unit 802 are coupled to a first electrode layer 801 and a second electrode layer 803 respectively. The elastic unit 802 is configured for operatively supporting the first electrode layer 801 and the second electrode layer 803. The elastic unit 802 is composed of a non-conductive elastic material, such as a rubber or a sponge. When the elastic unit 802 receives a force, the elastic unit 802 generates a deformation. When the force exerted on the elastic unit 802 disappears, the elastic unit 802 returns to its original shape. The above-mentioned descriptions about the elastic unit 802 represent merely the exemplary embodiment of the present disclosure, without any intention to limit the scope of the present disclosure thereto.

In summary, the smart device provided by the present disclosure has the ability of rejecting mistaken touching. A control unit controls the smart device to perform a specific action when the control unit at least receives a pressing signal or the control unit simultaneously receives the pressing signal and a moving signal. In other words, when the control unit only receives a moving signal, the control unit does not perform the specific action. When the capacitive button module is touched by a conductor, but the conductor moves slightly, the smart device determines this touching is a mistaken touching Hence, the smart device can effectively avoid mistaken touching. Moreover, the capacitive button module comprises an elastic layer, such that the capacitive button module can reduce wear caused by repeatedly pressing the capacitive button module.

On the other hand, the smart device provided by the present disclosure can perform other actions based upon a pressing signal, a moving signal and a displacement direction of the conductor, such as adjusting a volume of the smart device. Hence, the user can operate the smart device to perform a plurality of functions through the capacitive button module, and the smart device also can avoid mistaken touching.

The above-mentioned descriptions represent merely the exemplary embodiment of the present disclosure, without any intention to limit the scope of the present disclosure thereto. Various equivalent changes, alterations or modifications based on the claims of the present disclosure are all consequently viewed as being embraced by the scope of the present disclosure.

What is claimed is:

1. A smart device having ability for rejecting mistaken touching, comprising:
    a capacitive button module, disposed on the smart device, and the capacitive button module comprises:
    a contacting layer;
    a first electrode layer, comprising a first electrode;
    a second electrode layer, disposed under the contacting layer, and comprising at least one second electrode and at least one third electrode; and
    an elastic layer, disposed between the first electrode layer and the second electrode layer, configured for operatively generating a deformation when the elastic layer receives a pressure, such that a distance between the first electrode layer and the second electrode layer is changed;
    wherein the first electrode and the second electrode form a first inductive capacitor, the second electrode and the third electrode form a second inductive capacitor; when the elastic layer receives the pressure and generates the deformation, a pressing signal is generated according to a capacitance variation of the first inductive capacitor; when a conductor is close to or in contact with the contacting layer, a moving signal is generated according to a capacitance variation of the second inductive capacitor.

2. The smart device according to claim 1, wherein the second electrode is a driving electrode, and the first electrode and the third electrode are sensing electrodes; or the second electrode is the sensing electrode, and the first electrode and the third electrode are driving electrodes.

3. The smart device according to claim 2, wherein a number of the driving electrodes is greater than or equal to 1, and a number of the sensing electrodes is greater than 1.

4. The smart device according to claim 1, wherein the second electrode layer comprises a plurality of second electrodes and a plurality of third electrodes, a part of the second electrodes having areas which are different from each other, and a part of the third electrodes having areas which are different from each other.

5. The smart device according to claim 1, wherein the capacitive button module is electrically connected to a control module, the control module comprises a control unit, and the control unit is configured for operatively controlling the smart device in response to the pressing signal and the moving signal.

6. The smart device according to claim 5, wherein when the control unit receives the pressing signal, the control unit controls the smart device to perform a specific action based upon the pressing signal, or the control unit controls the smart device to perform the specific action based upon the pressing signal and the moving signal.

7. The smart device according to claim 6, wherein the specific action comprises unlocking a screen of the smart device or adjusting a volume of the smart device.

8. The smart device according to claim 5, wherein when the capacitance variation of the first inductive capacitor is higher than a first variation threshold, the second electrode or the first electrode generates the pressing signal.

9. The smart device according to claim 8, wherein when the control module or a processing unit of the capacitive button module detects the pressing signal, the processing unit instructs the control unit, such that the control unit controls the smart device to perform a specific action within a fixed period based upon the moving signal.

10. The smart device according to claim 9, wherein when the capacitance variation of the second inductive capacitor is higher than a second variation threshold, the second electrode or the third electrode generates the moving signal, and the processing unit calculates a displacement velocity based upon the moving signal.

11. The smart device according to claim 10, wherein when the processing unit determines a displacement speed associated with the displacement velocity is higher than a speed threshold, the processing unit instructs the control unit, such that the control unit controls the smart device to perform a specific action based upon a displacement direction associated with the displacement velocity.

12. The smart device according to claim 11, wherein the specific action comprises unlocking a screen of the smart device or adjusting a volume of the smart device.

13. The smart device according to claim 9, wherein the specific action comprises unlocking a screen of the smart device or adjusting a volume of the smart device.

14. The smart device according to claim 1, wherein the capacitive button module further comprises a flexible board, the flexible board is configured for operatively disposing the first electrode layer and the second electrode layer, wherein the contacting layer is a part of the flexible board.

15. The smart device according to claim 1, wherein the elastic layer is composed of an elastic material.

16. The smart device according to claim 1, wherein the elastic layer is composed of at least one elastic element, two terminals of the elastic element are respectively coupled to the first electrode layer and the second electrode layer.

* * * * *